(12) United States Patent
Serebro et al.

(10) Patent No.: US 10,862,984 B2
(45) Date of Patent: Dec. 8, 2020

(54) METHODS AND APPARATUS TO MONITOR USAGE OF VIRTUAL COMPUTING ENVIRONMENTS

(71) Applicant: VMware, Inc., Palo Alto, CA (US)

(72) Inventors: Boris Serebro, Rehovot (IL); Sagi Bernstein, Herzliya (IL)

(73) Assignee: VMware, Inc., Palo Alto, CA (US)

(*) Notice: Subject to any disclaimer, the term of this patent is extended or adjusted under 35 U.S.C. 154(b) by 546 days.

(21) Appl. No.: 14/840,576

(22) Filed: Aug. 31, 2015

(65) Prior Publication Data

US 2017/0064021 A1    Mar. 2, 2017

(51) Int. Cl.
| | | |
|---|---|---|
| G06F 15/16 | (2006.01) | |
| H04L 29/08 | (2006.01) | |
| H04M 15/00 | (2006.01) | |
| G06Q 10/06 | (2012.01) | |
| G06F 11/34 | (2006.01) | |
| G06F 11/30 | (2006.01) | |

(52) U.S. Cl.
CPC .......... *H04L 67/22* (2013.01); *G06F 11/3006* (2013.01); *G06F 11/3438* (2013.01); *G06F 11/3476* (2013.01); *G06Q 10/063* (2013.01); *H04L 67/2833* (2013.01); *H04M 15/00* (2013.01); *H04M 15/41* (2013.01); *H04M 15/44* (2013.01); *G06F 2201/815* (2013.01); *H04L 67/16* (2013.01)

(58) Field of Classification Search
CPC ...................................................... H04L 67/22
USPC ......................................................... 709/224
See application file for complete search history.

(56) References Cited

U.S. PATENT DOCUMENTS

| | | | | |
|---|---|---|---|---|
| 2011/0295999 | A1* | 12/2011 | Ferris ..................... | H04L 69/329 709/224 |
| 2012/0226808 | A1* | 9/2012 | Morgan .................. | G06Q 30/04 709/226 |
| 2013/0138810 | A1* | 5/2013 | Binyamin ............. | G06F 9/5072 709/225 |
| 2013/0235418 | A1* | 9/2013 | Tanaka ............... | H04N 1/00228 358/1.15 |
| 2014/0324964 | A1* | 10/2014 | Anand .................... | H04L 67/22 709/204 |
| 2014/0372539 | A1* | 12/2014 | Zaveri ................... | H04L 51/046 709/206 |

(Continued)

*Primary Examiner* — Kevin T Bates
*Assistant Examiner* — Clarence D McCray
(74) *Attorney, Agent, or Firm* — Clayton, McKay & Bailey, PC

(57) ABSTRACT

Methods, apparatus, systems and articles of manufacture are disclosed to monitor usage of virtual computing environments. An example method involves obtaining usage records from a probe manager. The example usage records associate users to occurrences of the users consuming a service. The example method also involves determining an association of the user identifiers with respective ones of the business units. The example method also involves creating aggregate usage records for the respective ones of the business units by assigning the usage records to the respective ones of the business units. Additionally, the example method involves transmitting the aggregate usage records to an infrastructure manager, the infrastructure manager to calculate total monetary costs of the service for the respective ones of the business units based on aggregate usage records.

21 Claims, 6 Drawing Sheets

(56) References Cited

U.S. PATENT DOCUMENTS

2015/0058471 A1* 2/2015 McPherson ......... H04L 12/1432
   709/224

\* cited by examiner

METHODS AND APPARATUS TO MONITOR USAGE OF VIRTUAL COMPUTING ENVIRONMENTS

FIELD OF THE DISCLOSURE

This disclosure relates generally to virtual computing environments, and, more particularly, to methods and apparatus to monitor usage of virtual computing environments.

BACKGROUND

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Companies may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than before.

BRIEF DESCRIPTION OF THE DRAWINGS

Wherever possible, the same reference numbers will be used throughout the drawing(s) and accompanying written description to refer to the same or like parts

DETAILED DESCRIPTION

Figure 1:
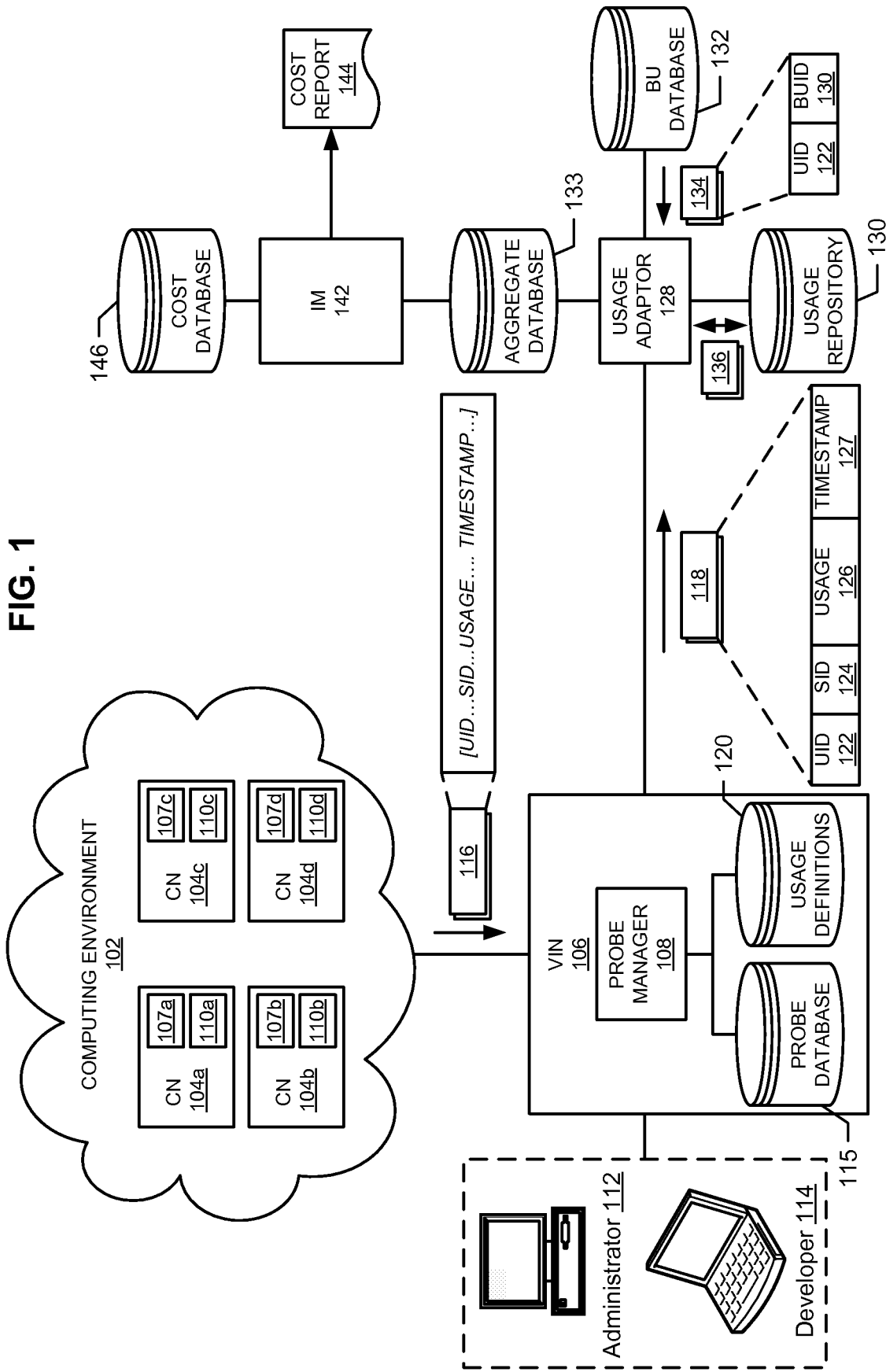
FIG. 1 is a block diagram of an example system constructed in accordance with the teachings of this disclosure to monitor usage of virtual computing environments.

Entities (e.g., companies, governments, universities, etc.) are often organized into business units (e.g., engineering department, sales department, information technology department, etc.). When members (e.g. employees, volunteers, students, etc.) of these business units use a computing environment(s) of the entity, costs associated with the usage of the computing environment(s) are often opaque. Thus, business units do not internalize the costs of using the computing environment(s) and do not make cost-value decisions regarding use of computing resources in the computing environment(s).

As disclosed herein below, administrator(s) and/or developer(s) may configure services (e.g., web servers, application servers, database servers, application components, etc.) executing on compute nodes (e.g., virtual machines, physical machines, containers, etc.) in a computing environment to generate audit logs that report when users use the services. In examples disclosed herein, probes and/or monitoring agents are installed on the compute nodes to be monitored. The probes and/or monitoring agents collect the audit logs from the compute nodes. An example probe is implemented as a script installed on a compute node to be monitored that lays dormant until a trigger event occurs. The example probe contains instructions to be executed when the trigger event occurs. For example, a trigger event may be a specific time (e.g., every day at 3:57 am, etc.) and/or a specific time interval (e.g., every hour, etc.). In some examples disclosed below, the probes and/or monitoring agents also collect a list of users registered with the service and their metadata (e.g., a user identifier (UID), etc.) from the compute nodes. As used herein, an identifier (ID) is any alphanumeric value that uniquely identifies an entity (e.g., a user, a business unit, a service, etc.). The example probes and/or the example monitoring agents transmit the audit logs to a virtual infrastructure navigator (VIN) (e.g., vCenter™ Infrastructure Navigator™, a commercially available product from VMWare®, Inc.) and/or a hyperic monitor (e.g., vRealize™ Hyperic, a commercially available product from VMware®, Inc.).

The example VIN provides dependency mapping for applications that have multiple services. The example VIN may also perform service discovery to identify new services in the computing environment. In examples disclosed herein, the example VIN includes a probe manager to receive the audit logs and the user metadata from the probes and/or monitoring agents installed on the compute nodes in the cloud computing environment. In some examples, from time to time (e.g., periodically, aperiodically, etc.), the probe manager communicates with the probes installed on the compute nodes to trigger the probes. In some examples, the probe manager parses the received audit logs and the user metadata to retain usage data of interest (e.g., UIDs associated with occurrences of service usage, timestamps corresponding to the occurrences of service usage, a service identifier (SID), etc.). The example probe manager formats the parsed audit data (e.g., into a delimiter-separated values (DSV) format, into an extensible markup language (XML) format, into a JavaScript Object Notation (JSON) format, etc.) to create usage data records.

In examples disclosed herein, a usage adaptor receives the parsed usage data records and creates business unit-assigned usage records. The example usage adaptor retrieves business unit-UID associations from an example business organization database. The business unit-UID associations includes business unit identifiers (BUIDs) corresponding to the business unit to which a user (e.g., as identified by the UID) is assigned. For example, a business unit-UID association <85, 1929> may associate a user, Elijah McCoy (UID: 1929), with the engineering department (BUID: 85). The example usage adaptor creates the business unit-assigned usage records by associating the UID associated with an occurrence of service usage, the BUID associated with the UID, a time associated with the occurrence of service usage, metadata regarding the usage, and the SID. For example, a business unit-assigned usage record for an occurrence of accessing (e.g., logging into) a Microsoft® Exchange Mailbox may be <1929, 85, 2015-05-14T18:37:12Z, 1, MS-EXMB>. The example usage adaptor stores the usage records into a usage repository (e.g., a relational database, etc.).

In examples disclosed below, from time to time (e.g., daily, weekly, monthly, etc.), the usage adaptor aggregates the business unit-assigned usage records stored in the usage repository. The example usage adaptor aggregates the business unit-assigned usage records by business unit and by a timeframe of interest. To aggregate the usage records, the example business controller retrieves the business unit-assigned usage records from the usage repository corresponding to the BUID of the business unit of interest that fall within the timeframe of interest. For example, the usage adaptor may retrieve business unit-assigned usage records for the engineering department from May 1st to May 31st. In some examples, the business unit-assigned usage records are aggregated based on the number of unique SIDs that accessed the service during the timeframe of interest. In such examples, the usage adaptor creates an aggregated account record with the BUID, the SUID, the count of unique SIDs, and the timeframe of interest. For example, an aggregate usage record may be <85, MS-EXMB, 115, 2015-05>. In some examples, the usage records are aggregated on a usage basis in which the usage adaptor counts occurrences of service usage during the timeframe of interest. In such examples, the usage adaptor creates an aggregated usage record with the BUID, the SUID, the count of occurrences of service usage, and the timeframe of interest. For example, an aggregated usage record may be <85, SQLSVR5, 12001, 2015-05> (e.g., the BUID is 85, the SID is SQLSVR5, the usage metadata is 12001, and the timeframe of interest is May 2015). In some examples, the usage records may be aggregated on other bases, such as a volume basis (e.g., how many kilobytes were used in the timeframe of interest, etc.) or a resource basis (e.g., how many and how long processor cores were used, how many gigabytes of disk space were occupied during the timeframe of interest, etc.).

In examples disclosed below, an infrastructure manager (IM) retrieves the aggregated records (e.g., aggregated usage records, aggregated account records, etc.) and determines a cost for the service to be attributed to the business unit. By using the aggregated records generated by usage adaptor, the IM save memory and/or processing cycles by not storing and/or processing a usage model to estimate how the business units use the services. The IM maintains a list of costs of services executing in the cloud computing environment. In some examples, the cost of a service is determined based on a number of accounts that accessed the service during a timeframe of interest (e.g., an account basis). Alternatively, in some examples, the cost of a service is determined based on how many times the service was accessed during the timeframe of interest and/or how much of the service was used (e.g., how many kilobytes were used, etc.) (e.g., a usage basis). The cost of a service may include actual costs (e.g., licensing fees, subscription fees, etc.) and estimated costs (e.g., cost of utilities, cost of maintenance of the service, etc.).

As used herein, a database and/or a repository is any suitable data structure stored in memory and/or mass storage that allows groups of associated data (e.g., records) to be inserted, searched, and retrieved. For example, a database and/or a repository may be a relational database (e.g., MySQL, Oracle, dBase, etc.), a flatfile database, etc.

As used herein, compute nodes include non-virtualized physical hosts, virtual machines, containers that run on top of a host operating system without the need for a hypervisor or separate operating system, and hypervisor kernel network interface modules. In some examples, a compute nodes may be referred to as a data computer end node or as an addressable node. Virtual machines operate with their own guest operating system on a host using resources of the host virtualized by virtualization software (e.g., a hypervisor, virtual machine monitor, etc.). Numerous virtual machines can run on a single computer of processor system in a logically separate manner from one another. A virtual machine can execute instances of applications or programs separate from application/program instances executed by other virtual machines on the same computer. In examples disclosed herein, containers are constructs that run on top of a host operating system without the need for a hypervisor or a separate guest operating system. Like virtual machines, containers are also logically separate from one another, and numerous containers can run on a single computer. Also like virtual machines, a container can execute instances of applications or programs separate from application/program instances executed by the other containers on the same computer or processor system. In some examples, the host operating system uses name spaces to isolate the containers from each other and therefore provides operating-system level segregation of the different groups of applications that operate within different containers. This segregation is akin to the virtual machine segregation that is offered in hypervisor-virtualized environments that virtualize system hardware, and thus can be viewed as a form of virtualization that isolates different groups of applications that operate in different containers. In some examples, such containers are more lightweight than virtual machines. In some examples, an operating system hosting containers may be hosted by a virtual machine. For example, a plurality of virtual machines may guest operating systems that each hosts a plurality of containers to provide the benefits of containers and the benefits of virtual machines management in a single system. In some examples disclosed herein, a hypervisor kernel network interface module is a non-virtual machine compute node that includes a network stack with a hypervisor kernel network interface and receive/transmit threads. An example of a hypervisor kernel network interface module includes the vmknic module that is part of the ESXi™ hypervisor provided by VMware®, Inc.

FIG. 1 is a block diagram of an example system to monitor usage of a computing environment 102. The example system includes the example computing environment 102, an example VIN 106, an example usage adaptor 128, and the example infrastructure manager (IM) 142. In the illustrated example, the system also includes an example usage repository 130, an example business organization database 132, an example aggregate database 133, and an example cost database 146. The example usage repository 130, the example business organization database 132, and/or the example cost database 146 are any suitable data structures stored in memory and/or mass storage that allow groups of associated data (e.g., records) to be inserted, searched, and retrieved. For example, the example usage repository 130, the example business organization database 132, and/or the example cost database 146 may be relational databases (e.g., MySQL, Oracle, dBase, etc.), flatfile databases, etc.

In the illustrated example, the computing environment 102 includes example compute nodes 104a-104d. The examples compute nodes 104a-104d may be virtual machines, physical machines, containers, and/or hypervisor kernel network interface modules, or a combination of virtual machines, physical machines, containers, and/or hypervisor kernel network interface modules. In some examples, the compute nodes 104a-104d are located at a single location (e.g., a datacenter). Alternatively, the compute nodes 104a-104d may be located at different locations (e.g., different campuses of a company, etc.). In the illustrated example, the compute nodes 104a-104d host services 107a-107d. The example services 107a-107d provide functionality for applications executing in the computing environment 102. For example, a first one of the services 107a-107d may provide mailbox functionality, a second one of the services 107a-107d may provide account authentication, a third one of the services 107a-107d may provide spam filtering, and a fourth one of the services 107a-107d may provide database services.

The example VIN 106 monitors the example computing environment 102. The example VIN 106 manages the example compute nodes 104a-104d by, for example, automatically discovering services 107a-107d executing on the compute nodes 104a-104d, visualizing relationships, and mapping dependencies between the services 107a-107d executing on the compute nodes 104a-104d. The VIN 106 of the illustrated example is deployed on a virtual machine separate from the example compute nodes 104a-104d. Alternatively, the VIN 106 may be executed on a physical computing device, may execute on one of the example compute nodes 104a-104d, etc.

In the illustrated example, the VIN 106 includes an example probe manager 108, an example probe database 115, and an example definition database 120.

The example probe manager 108 communicates with example probes 110a-110d installed on the compute nodes 104a-104d to retrieve monitoring information collected by the example probes 110a-110d. In some examples, the probe manager 108 communicates to the probes 110a-110d via a Transmission Control Protocol/Internet Protocol (TCP/IP) connection. Additionally, the example probe manager 108 manages (e.g., creates, distributes, deletes, etc.) the example probes 110a-110d. In some examples, the probes 110a-110d are scripts that execute on the example computer nodes 104a-104d in a privileged mode in response to a trigger. For example, the probes 110a-110d execute with administrator privileges. Alternatively, the scripts may execute with any other privileges, such as, for example, service privileges, guest privileges, etc. In some such examples, the example trigger defines an event (e.g., logical conditions, external messages, execution of a specified function, etc.) that cause the example probes 110a-110d to execute on the example compute nodes 104a-104d. In some examples, the trigger is set to cause the probe 110a-110d to execute periodically (e.g., hourly, daily, etc.). Alternatively or additionally, in some examples, the probe manager 108 sends messages to the compute nodes 104a-104d to trigger the execution of the probes 110a-110d.

The example probe manager 108 provides an interface in which administrators 112 and/or developers 114 generate and/or mange the probes 104a-104d. For example, interface of the probe manager 108 may provide tools used to write and/or generate the scripts. Additionally, the probe manager 108 provides the interface in which the administrators 112 and/or the developers 114 specify which of the example services 107a-107d the probes 104a-104d are to monitor. In some examples, the probe manager 108 automatically installs the probes 110a-110d on the example compute nodes 104a-104d with the service(s) 107a-107d to be monitored specified by the administrator(s) 112 and/or the developer(s) 114 based on the VIN 106 discovering the example services 107a-107d installed on the example compute nodes 104a-104d. In the illustrated example, the generated probes 110a-110d are stored in the example probe database 115. In such a manner, the probes 110a-110d may be generated and stored in the probe database 115, and deployed by the probe manager 108 when the example VIN 106 detects a corresponding one of the service 107a-107d installed on the compute nodes 104a-104d.

Alternatively, in some examples, the probes 110a-110d are not installed on the compute nodes 104a-104b. In such examples, the probe manager 108 maintains (e.g., stores, generates, deletes, etc.) a series of commands that discover services 107a-107d executing on the computer nodes 104a-104d and/or retrieve the auditing data 116 from the auditing logs. In such examples, the commands used by the probe manager are integrated into the example computer nodes 104a-104d. In such examples, from time to time (e.g., hourly, daily, etc.), the probe manager 108 connects to the compute nodes 104a-104d and performs the series of commands. Alternatively, in some examples, the probes 110a-110d are monitoring agents (e.g., hyperic agents, etc.) and the probe manager is a hyperic monitor.

In some examples, the services 107a-107d generate auditing logs by default (e.g., a setting to produce the audit logs is already enabled when the service 107a-107d is installed). In some examples, the auditing logs for one or more of the services 107a-107d are stored in memory (e.g., a Random Access Memory (RAM) Disk, etc.) of the corresponding one of the compute nodes 104a-104d. Additionally or alternatively, in some examples, the auditing logs are stored in a mass storage device (e.g., a hard disk, a solid state memory drive, etc.). In some examples, the administrator(s) 112 and/or the developer(s) 114 enable audit logs for the services to be monitored using an interface provided by the example VIN 106. In the illustrated example, when triggered, the probes 110a-110d collect audit data 116 from the audit logs produced by the services 107a-107d and send the audit data 116 to the probe manager 108. In some examples, the probes 110a-110d collect audit data 116 that has been added since the last time the probes 110a-110d were triggered.

In the illustrated example of FIG. 1, the probe manager 108 parses the example audit data 116 to produce example usage records 118 by filtering portions of the audit data 116 that are of interest. To identify which portions of the example audit data 116 are of interest, the example probe manager 108 retrieves usage definitions stored in the example definition database 120. For example, the usage definitions corresponding to a service (e.g., the example services 107a-107d) may identify portions of the audit data 116 corresponding to UID(s) 122, SID(s) 124, usage data 126 indicative of usage of the service, and time stamps 127 indicative of when the service was used, etc. For example, for one of the example services 107a-107d that manages data storage in the computing environment 102, a usage definition may identify portions of the audit log 116 corresponding to the usage data 126 indicative of usage of the service such as, data storage, data ingress, and data egress. A first portion of the example audit data 116 corresponding to a first service (e.g., the service 107a) may be in a different format than a second portion of the example audit data 116 corresponding to a second service (e.g., the service 107b). In the illustrated example, the usage data 116 in the different usage records 118 corresponds to different instances of the usage of the service 110a-110d associated with a user (e.g., a UID 122).

In some examples, the probe manager 108 transforms the parsed audit data (e.g. the usage records 118) into a standardized format (e.g., DSV, XML, JSON, etc.). For example, the probe manager 108 may generate a file in which elements (e.g., the UID 122, the SID 124, the usage data 126, the time stamp 127, etc.) of one of the usage records 118 are separated by a comma, and each one the usage records 118 is separated by a line break. As another example, the manager 108 may generate a file in which each one the usage records 118 are contained within a parent tag, and the elements (e.g., the UID 122, the SID 124, the usage data 126, the time stamp 127, etc.) of one of the usage records 118 are contained in child tags.

In the illustrated example of FIG. 1, the example usage adaptor 128 receives or otherwise retrieves the example usage records 118 from the example probe manager 108. In some examples, the usage adaptor 128 retrieves the usage records 118 from a location (e.g., on a mass storage device) that both the usage adaptor 128 and the probe manager 108 have privileges to access. Alternatively, in some examples, the usage adaptor 128 connects to the example VIN 106 via a network communication protocol (e.g., TCP/IP, File Transfer Protocol (FTP), etc.). Alternatively or additionally, in some examples, the usage records 118 may be managed (e.g., stored, transmitted, etc.) by an intermediary manager (e.g., vCenter Server™, a commercially available product from VMWare®, Inc.). In some such examples, the probe manager 108 connects to the intermediary manager to store the usage records 118, and the usage adaptor 123 connects to the intermediary manager to retrieve the usage records 118. The example usage adaptor 128 uses the UIDs 122 included with the usage records 118 to retrieve an example business unit-user record 134 from the example business organization database 132. The example business unit-user record 134 specifies which business unit (e.g., which BUID 132) the user corresponding to the UID 122 is assigned. The example usage adaptor 128 assigns the BUIDs 130 to the corresponding usage records 118 to create business unit-assigned usage records 136. In the illustrated example, the usage adaptor 128 inserts the business unit-assigned usage records 136 in the usage repository 138. In some examples, the usage adaptor 128 is integrated into the example IM 142. Alternatively, in some examples, the usage adaptor 128 is integrated with the example VIN 106, is a stand-alone device or system, etc.

The example business organization database 132 stores business unit-user records 134. The example business organization database 132 is any data structure suitable to store the business unit-user records 134 in the memory and/or the mass storage devices of the example usage adaptor 128, such as a relational database (e.g., MySQL, Oracle, dBase, etc.), or a flatfile database, an Microsoft® Exchange file, etc. In some examples, the business organization database 132 is maintained by the administrator(s) 112 and/or the developer (s) 114. Alternatively or additionally, in some examples, the business organization database 134 is maintain by a human resources management system.

In the illustrated example, at time intervals (e.g., daily, weekly, monthly, etc.) specified by the administrator(s) 112 and/or the developer(s) 114, the usage adaptor 128 aggregates the business unit-assigned usage records 136 stored in the usage repository 138. The example usage adaptor 128 aggregates the business unit-assigned usage records 136 by BUID 130 and by a timeframe of interest specified by the administrator(s) 112 and/or the developer(s) 114. For example, the timeframe of interest may be set to a relatively short period (e.g., a day, a week, etc.) to allow for a relatively quick assessment of costs, and/or may be set of a relatively longer period (e.g., monthly, quarterly, etc.) for business unit expense budgeting. To aggregate the business unit-assigned usage records 136, the example usage adaptor 128 retrieves the business unit-assigned usage records 136 from the usage repository 138 that fall within the timeframe of interest corresponding to the BUID 130 of the business unit of interest and the SID 124 of the service 107a-107d of interest. The example usage adaptor 128 stores the aggregated business unit-assigned usage records 136 in the example aggregate database 133. Alternatively, in some examples, the example usage adaptor 128 provides the aggregated business unit-assigned usage records 136 to the example IM 142.

As discussed below in relation to FIG. 2, the example usage adaptor 128 aggregates the example business unit-assigned usage records 136 for a particular service 107a-107d based on how the example IM 142 determines the costs for the service 107a-107d. In some examples, if the example IM 142 determines costs for a particular service 107a-107d on an accounts basis, the example usage adaptor 128 aggregates the business unit-assigned usage records 136 based on a number of unique SIDs 122 associated with the BUID 130 of interest that accessed the particular service 107a-107d of interest during the timeframe of interest. Alternatively, in some examples, if the example IM 142 determines costs for a particular service 107a-107d on a usage basis, the example usage adaptor 128 aggregates the business unit-assigned usage records 136 based on a number of times the corresponding service 107a-107d was used during the timeframe of interest associated with the BUID 130 of interest. Alternatively, in some examples, if the example IM 142 determines costs for a particular service 107a-107d on a resource basis, the example usage adaptor 128 aggregates the business unit-assigned usage records 136 based on an amount of resources (e.g., processor cycles, storage space, etc.) the particular service 107a-107d used during the timeframe of interest.

The example IM 142 retrieves the aggregated business unit-assigned usage records 136 from the aggregate database 133. Alternatively, in some examples, the IM 142 receives the aggregated business unit-assigned usage records 136 from the usage adaptor 128. The example IM 142 generates a cost report 144 based on aggregated business unit-assigned usage records 136 and cost records associated with the service 107a-107d of interest stored in the cost database 146. The cost records include actual costs (e.g., licensing fees, subscription fees, etc.) and/or estimated costs (e.g., cost of utilities, cost of maintenance of the service, etc.) of providing the service 107a-107d. In some examples, the cost records are available on a granular level. In such examples, the IM 142 determines a cost attributable for the service 107a-107d of interest to a business unit by using the corresponding cost record and the usage data 126 in the aggregated business unit-assigned usage records 136. For example, a cost record associated with an email service may state that the license fee for the email service (e.g., a service of interest) is five dollars per UID 122 that accessed the email service in a month (e.g., a timeframe of interest).

By providing the aggregated business unit-assigned usage records 136, the usage adaptor 128 supplies the IM 142 with data indicative of actual use of the services 107a-107d. Thus, the usage adaptor 128 eliminates a need for the IM 142 to rely on models to estimate how the business units use the services 107a-107d. In such a manner, the IM 142 does not need to store the models in memory and/or use processor cycles to execute the models. Additionally, the cost reports 144 generated by the IM 142 based on the aggregated business unit-assigned usage records 136 are more accurate than the cost reports 144 generated using the models.

In some examples, cost information in the cost record is available on a fixed fee basis (e.g., a license fee regardless of the number of users) or an aggregate basis (e.g., cost of power to operate the server). In some such examples, the costs are calculated in accordance with Equation 1 below.

$$C_{BU}(S) = C_t(S) \times \frac{P(BU)}{P_t} \quad \text{Equation 1}$$

In Equation 1, $C_{BU}(S)$ is the cost of the service of interest for the business unit of interest, $C_t(S)$ is the total cost of the service of interest, P(BU) is the usage 126 of the service of interest for the business unit of interest, and $P_t$ is the total usage of the service of interest. For example, the cost record associated with a data management service may indicate that over a timeframe of interest, the cost to operate the data management service was $8,341 for 1,241 GB of disk space. In such an example, if the aggregated business unit-assigned usage records 136 attributed to a business unit of interest indicate that the business unit of interest used 398 GB of disk space during the timeframe of interest, the cost of the data management service attributable to the business unit of interest is $2,675.03.

In the illustrated example, the IM 142 generated the cost report 144 for a business unit of interest after calculating the costs of services of interest used by the business unit of interest during a timeframe of interest. The example IM 142 stores the cost report 144 in a cost report database 146. In such a manner, the IM 142 generates the cost report 144 based on the aggregated business unit-assigned usage records 136 received from the usage adaptor 128 and does not configured in advance to know which business units user which services. In addition, the cost reports 144 are based on actual usage and not modeled estimated usage.

In operation of the example computing environment 102, the example probe manager 108 communicates with the probes 110a-110d installed on the examples compute nodes 104a-104d. The example probe manager 108 retrieves and/or otherwise receives audit records 116 from the probes 110a-110d. In the illustrated example, the probe manager 108 transmits the usage records 118 to the usage adaptor 128. The example usage adaptor 128 generates the business-unit assigned usage records 136 based on associations stored in the example business organization database 132, and stores the business-unit assigned usage records 136 in the example usage repository 130. Additionally, in the illustrated example, the usage adaptor 128 aggregates the business unit-assigned usage records 136. The example usage adaptor 128 sends the aggregated business unit-assigned usage records 136 to the example IM 142. The example IM 142 uses the aggregated business unit-assigned usage records 136 to assign a cost of a service of interest (e.g., one of the services 107a-107d) to a business unit.

Figure 2:
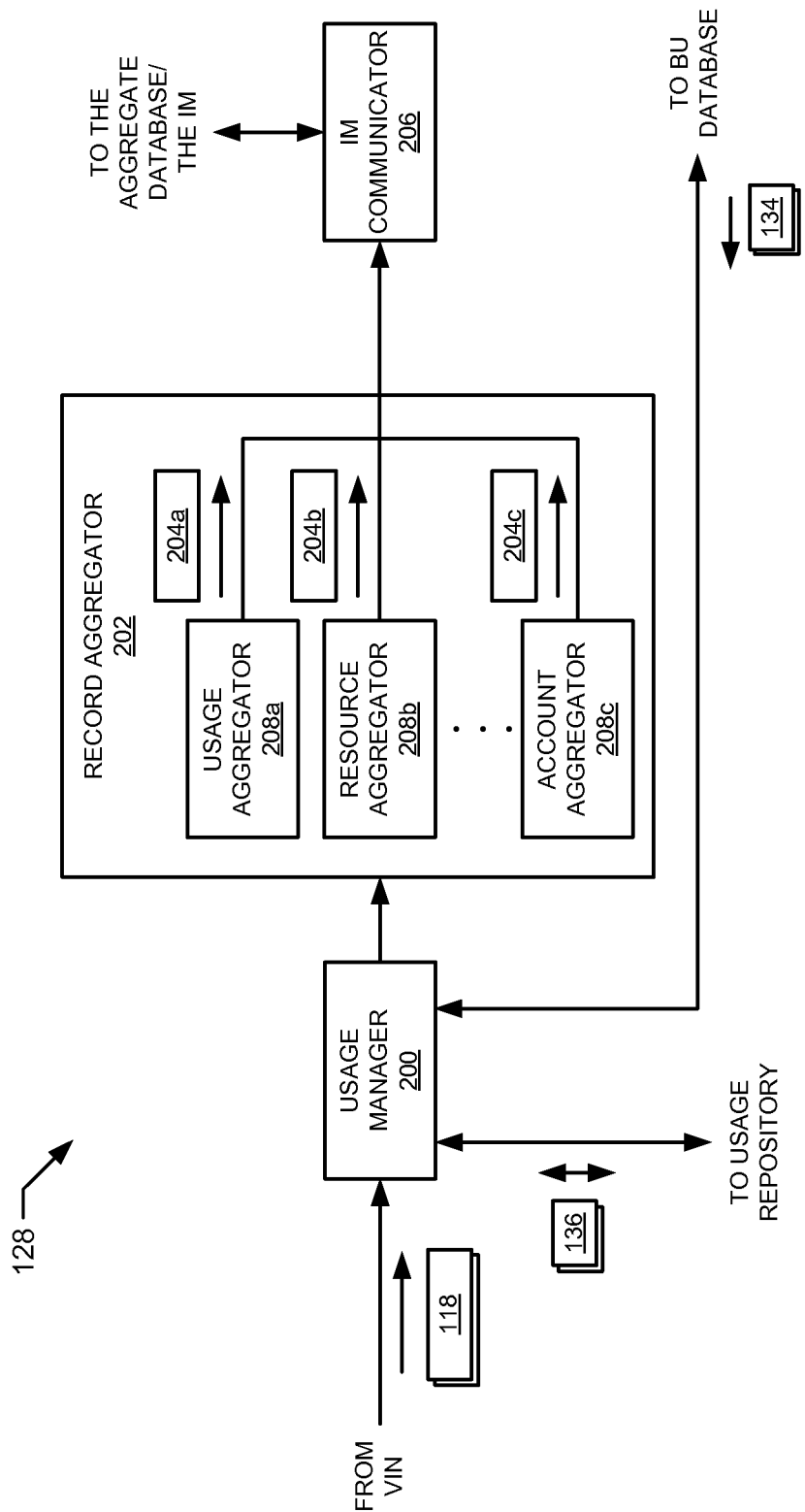
FIG. 2 is a block diagram of the example usage adaptor to provide aggregate usage data to calculate the cost of operating the example computing environment of FIG. 1.

FIG. 2 is a block diagram of the example usage adaptor 128 to provide aggregated usage record to calculate the cost of operating a computing environment, such as the example computing environment 102 of FIG. 1. In the illustrated example, the usage adaptor 128 includes an example usage manager 200 to manage usage records 118 received from the probe manager 108 (FIG. 1), an example record aggregator 202 to generate aggregate usage records 204a-204c, and an example IM communicator 206 to manage communication of the aggregate usage records 204a-204c to the IM 142 (FIG. 1) and/or store the aggregate usage records 204a-204c in the aggregate database 133 (FIG. 1).

In the illustrated example of FIG. 2, the usage manager 200 receives or otherwise retrieves the usage records 118 from the probe manager 108. After receiving or otherwise retrieving a usage record 118, the example usage manager 200 retrieves a business unit-user record 134 from the example business organization database 132 (FIG. 1) using the UID 122 included with the example usage record 118. The example usage manager 200 appends the BUID 130 from the retrieved business unit-user record 134 to the usage record 118 to create a business unit-assigned usage record 136. For example, if the usage record 118 is <UID: 694489, SID: SQLSVR40, USAGE: 1955, TIMESTAMP: 2011-11-29> and the corresponding business unit-user association 134 is <UID: 694489, BUID: 872657>, the resulting business unit-assigned usage record 136 would be <UID: 694489, SID: SQLSVR40, USAGE: 1955, TIMESTAMP: 2011-11-29, BUID: 872657>, where in the BUID 130 ("872657") has been appended to the matching usage record 118. The example usage manager 200 then inserts the generated business unit-assigned usage record 136 into the usage repository 138.

From time to time (e.g., daily, weekly, monthly, etc.), the example usage manager 200 retrieves business unit-assigned usage records 136 from the usage repository 138 that correspond to (i) a business unit of interest (e.g., via the BIUD 130 of the business unit of interest), (ii) a service (e.g., the service 107a of FIG. 1) of interest (e.g., via the SID 124 of the service of interest), and (iii) a timeframe of interest (e.g., the timestamp 127). For example, if the audit logs 116 (FIG. 1) for a service 107a are collected from a computer node 104a once a day, there are 289 employees in a business unit, and the timeframe of interest spans 28 days (e.g., February 1 to February 28), the usage manager 200 may retrieve up to 8,092 business unit-assigned usage records 136 from the usage repository 138. The usage manager 200 provides retrieved business unit-assigned usage records 136 to the record aggregator 202.

The record aggregator 202 of the illustrated example aggregates the business unit-assigned usage records 136 received from the example usage manager 200 to create an aggregate usage record 204a-204c. The example record aggregator 202 includes one or more aggregators 208a-208c that aggregate the business unit-assigned usage records 136 based on how the cost of using the service of interest is calculated by the IM 142. Additionally, the example record aggregator 202 maintains a list specifying which aggregator 208a-208c to use for a given service of interest (e.g., specified by the SID 124). In some examples, after creating an aggregate usage record 204a-204c, the record aggregator 202 sends the aggregate usage record 204a-204c to the example IM communicator 206 to be forwarded to the IM 142 and/or to be stored in the example aggregate database 133.

In the illustrated example of FIG. 2, the record aggregator 202 includes an example usage aggregator 208a, an example resource aggregator 208b, and an example account aggregator 208c. The example usage aggregator 208a counts occurrences of service usage (e.g., via the usage field 126) in the business unit-assigned usage records 136. For example, the usage aggregator 208a may determine that in 8,092 business unit-assigned usage records 136 received from the usage manager 200, a MySQL Server (e.g., the service of interest) was queried 27,003 times. The example usage aggregator 208a is used when the cost of the service of interest is calculated based on the number times the service is accessed. The example usage aggregator 208*a* generates an aggregate usage record 204*a* that associates the BUID 130, the SID 124, and the calculated count of occurrences of service usage.

The example resource aggregator 208*b* determines the amount of a resource (e.g., via the usage 126 field) associated with the service of interest that was used during the timeframe of interest. For example, the resource aggregator may determine that in the 8,092 business unit-assigned usage records 136 received from the usage manager 200, 1797 GB of outgoing bandwidth was used. The example resource aggregator 208*b* is used when the cost of the service of interest is calculated by an amount of a resource (e.g., disk space, processor time, bandwidth, etc.) that was used during the timeframe of interest. The example resource aggregator 208*b* generates an aggregate usage record 204*b* that associates the BUID 130, the SID 124, and the calculated amount of resource usage.

The example account aggregator 208*c* determines a number of unique UIDs 122 that used (e.g., logged in, accessed, etc.) the service of interest during the timeframe of interest. For example, the usage aggregator 208*c* may determine that 173 unique UIDs 122 associated with the business unit of interest accessed an email server (e.g., the service of interest). The example account aggregator 208*c* is used when the cost of the service of interest is calculated by a number of active accounts during the timeframe of interest. The example account aggregator 208*c* generates an aggregate usage record 204*c* that associates the BUID 130, the SID 124, and the calculated count of unique UIDs 122.

In the illustrated example, the IM communicator 206 receives or otherwise retrieves the aggregate usage records 204*a*-204*c* from the example record aggregator 202. In some examples, the example IM communicator 206 sends the aggregate usage records 204*a*-204*c* to the IM 142. In some such examples, the IM communicator 206 establishes a connection with the IM 142 through a network communication protocol (e.g., hypertext transfer protocol (HTTP), file transfer protocol, etc.). In such some examples, the IM communicator 206 sends the aggregate usage records 204*a*-204*c* to the IM 142 as they are created by the record aggregator 202. Alternatively, in some examples, the IM communicator 206 stores the aggregate usage records 204*a*-204*c* in the aggregate database 133 (FIG. 1) to be retrieved by the IM 142.

While an example manner of implementing the example usage adaptor 128 of FIG. 1 is illustrated in FIG. 2, one or more of the elements, processes and/or devices illustrated in FIG. 2 may be combined, divided, re-arranged, omitted, eliminated and/or implemented in any other way. Further, the example usage manager 200, the example record aggregator 202, the example IM communicator 206, and/or, more generally, the example usage adaptor 128 of FIG. 1 may be implemented by hardware, software, firmware and/or any combination of hardware, software and/or firmware. Thus, for example, any of the example usage manager 200, the example record aggregator 202, the example IM communicator 206, and/or, more generally, the example usage adaptor 128 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example usage manager 200, the example record aggregator 202, and/or the example IM communicator 206 is/are hereby expressly defined to include a tangible computer readable storage device or storage disk such as a memory, a digital versatile disk (DVD), a compact disk (CD), a Blu-ray disk, etc. storing the software and/or firmware. Further still, the example usage adaptor 128 of FIG. 1 may include one or more elements, processes and/or devices in addition to, or instead of, those illustrated in FIG. 2, and/or may include more than one of any or all of the illustrated elements, processes and devices.

Figure 4:
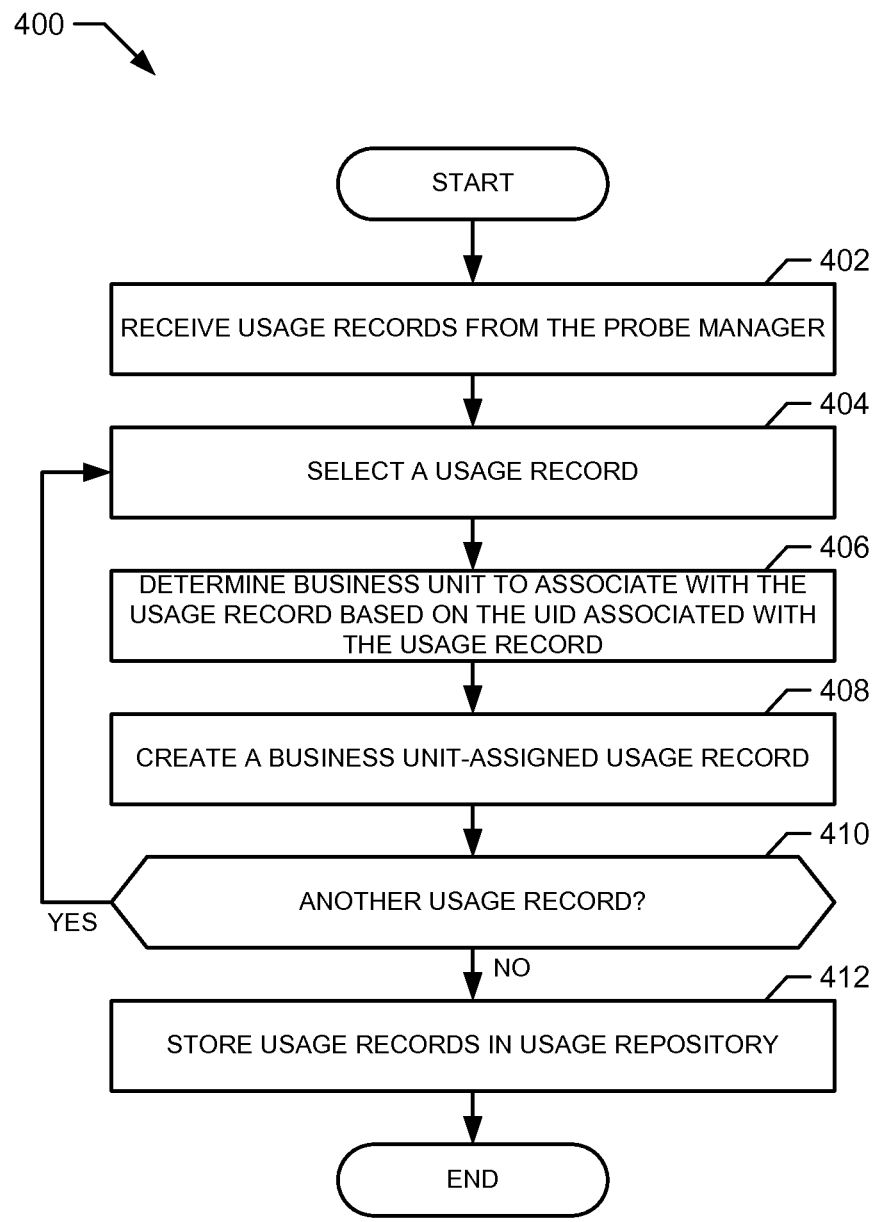
FIG. 4 is a flowchart representative of example machine readable instructions that may be executed to implement the example usage adaptor of FIGS. 1 and/or 2 to generate usage records.
Figure 5:
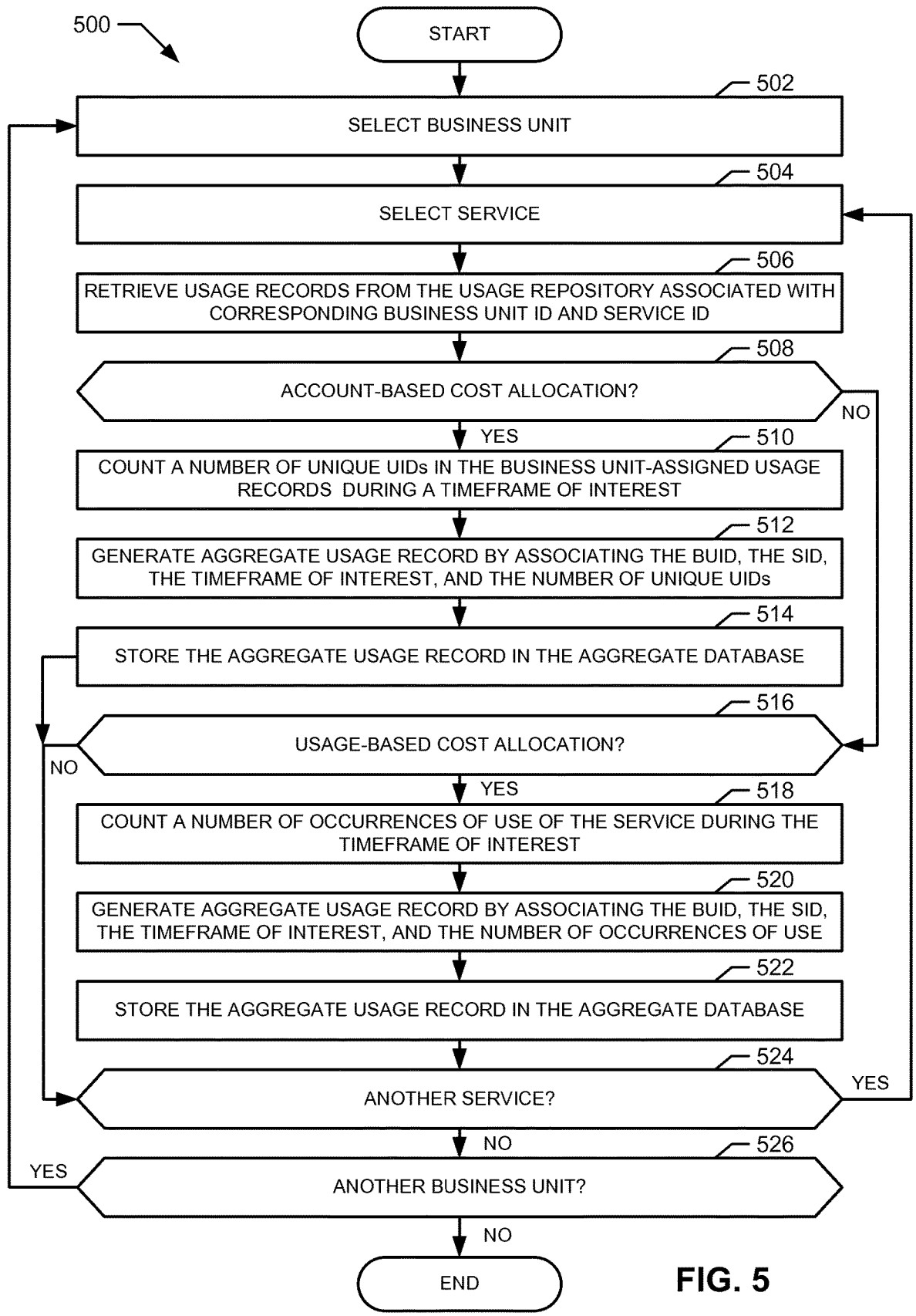
FIG. 5 is a flowchart representative of example machine readable instructions that may be executed to implement the example usage adaptor of FIGS. 1 and/or 2 to generate usage records.

A flowchart representative of example machine readable instructions for implementing the probe manager 108 of FIG. 1 is shown in FIG. 2. Flowcharts representative of example machine readable instructions for implementing the usage adaptor 128 of FIGS. 1 and 2 are shown in FIGS. 4 and 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example programs are described with reference to the flowcharts illustrated in FIGS. 3, 4, and/or 5, many other methods of implementing the example probe manager 108 and/or the example usage adaptor 128 may alternatively be used. For example, the order of execution of the blocks may be changed, and/or some of the blocks described may be changed, eliminated, or combined.

As mentioned above, the example processes of FIGS. 3, 4, and/or 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, and/or 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 3:
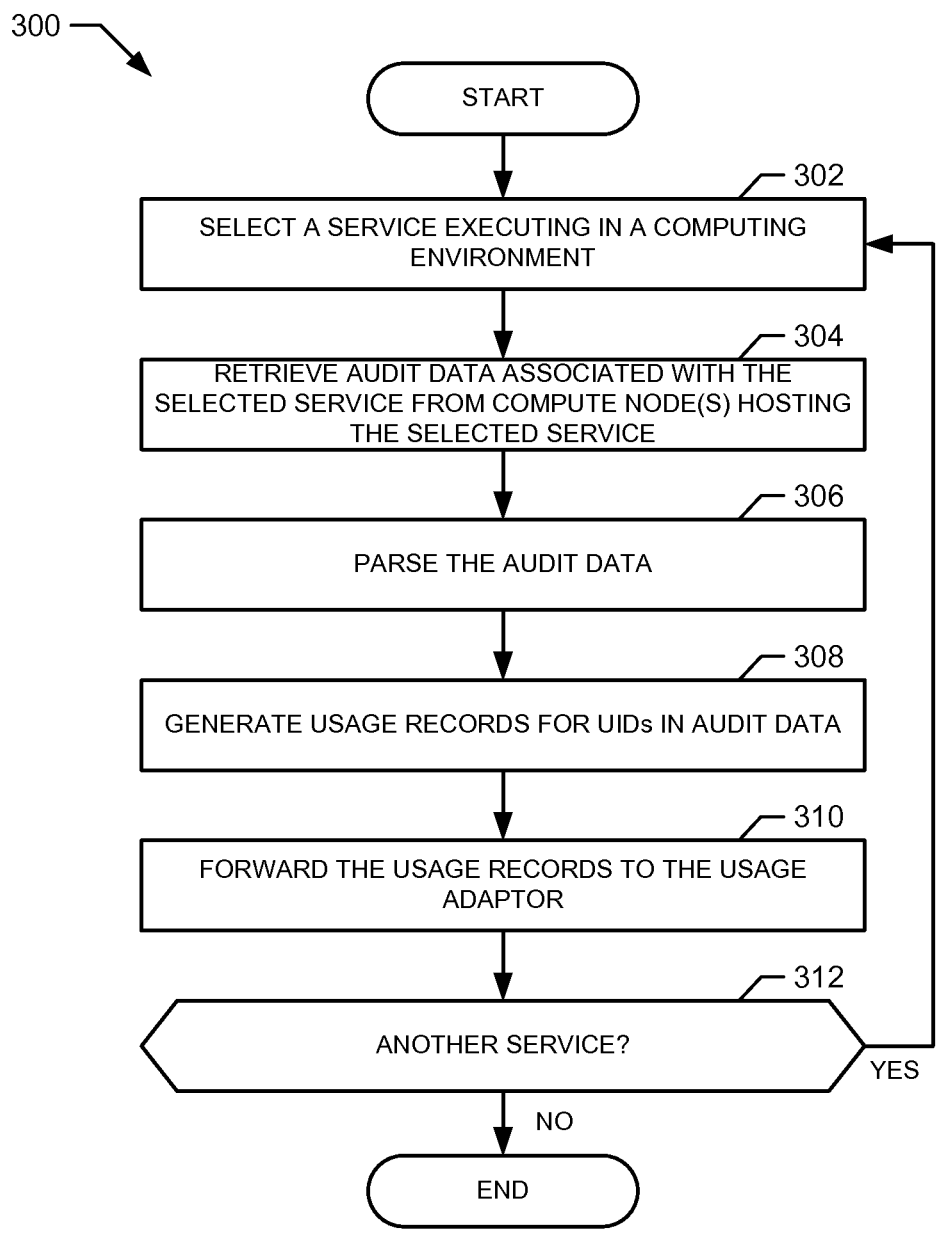
FIG. 3 is a flowchart representative of example machine readable instructions that may be executed to implement the example probe manager of FIG. 1 to retrieve audit data from example compute nodes in the example computing environment of FIG. 1.

FIG. 3 is a flowchart representative of example machine readable instructions 300 that may be executed to implement the example probe manager 108 of FIG. 1 to retrieve audit data 116 from the example compute nodes 104a-104d in the example computing environment 102 of FIG. 1. Initially, at block 302, the example probe manager 108 selects a service (e.g., the service 107a of FIG. 1) executing in the computing environment 102. In some examples, the probe manager 108 selects the service 107a based on a request made by an administrator 112 (FIG. 1) and/or a developer 114 (FIG. 1). Alternatively or additionally, in some examples, the probe manager 108 selects the example service 107a based on a list of services generated by the VIN 106 when the VIN 106 performs a service discovery cycle (e.g., the VIN 106 uses probes and/or monitoring agents installed on the compute nodes 104a-104d to discover the services 107a-107d installed on the compute nodes 104a-104d).

At block 304, the example probe manager 108, via the example probes 110a-110d installed on the compute nodes 104a-104d, retrieves the example audit data 116 associated with the service selected at block 302 from the compute nodes 104a-104d. In some examples, to retrieve the audit data 116, the probe manager 108 connects to the probes 110a-110d via a TCP/IP connection. At block 306, the example probe manager 108 parses the audit data 116 retrieved at block 304 to identify the UIDs 122 with associated usage data 126, the SID 124, and/or a timestamp 127. At block 308, the probe manager 108 generates a usage record 118 (FIGS. 1 and 2) for each of the UID(s) 122 identified at block 306. The example usage records 118 include the UID 122, the associated usage data 126, the SID 124 and/or the corresponding timestamp 127.

At block 310, the example probe manager 108 forwards the usage records generated at block 308 to the example usage adaptor 128. At block 312, the example probe manager 108 determines if there is another service to select. For example, the probe manager 108 determines if there is another service on the list of services maintained by the VIN 106. If there is another service, program control returns to block 302 to process the next service. Otherwise, if there is not another service, the example program 300 ends.

FIG. 4 is a flowchart representative of example machine readable instructions 400 that may be executed to implement the example usage adaptor 128 of FIG. 1 to generate business unit-assigned usage records 136. Initially, at block 402, the example usage manager 200 (FIG. 2) receives or otherwise retrieves usage records 118 (FIGS. 1 and 2) from the example probe manager 108. At block 404, the example usage manager 200 selects one of the usage records 118 received at block 402. At block 406, the example usage manager 200 determines which business unit to associate with the usage record 118 based on the UID 122 included with the usage record 118. In some examples, the usage manager 200 uses the UID 122 to query a business organization database 132 (FIG. 1) to retrieve a business unit-user association 134 (FIGS. 1 and 2) identifying which BUID 130 (FIG. 1) is associated with the UID 122.

At block 408, the example usage manager 200 creates the example business unit-assigned usage record 136 by appending the BUID 130 determined at block 406 to the usage record 118 selected at block 404. At block 410, the example usage manager 200 determines whether there is another one of the usage records 118 to transform. If there is another usage record 118 to transform, program control returns to block 404 to process the next one of the usage records 118. Otherwise, if there is not another one of the usage records 118 to transform, the example usage manager 200 inserts the created business unit-assigned usage records 136 into an example usage repository 138 (at block 412). The example program 400 then ends.

FIG. 5 is a flowchart representative of example machine readable instructions 500 that may be executed to implement the example usage adaptor 128 of FIGS. 1 and 2 to generate aggregate usage records (e.g., the aggregate usage records 204a-204c of FIG. 1). Initially, at block 502, the example usage manager 200 selects a business unit. In some examples, the usage manager 200 selects the business unit from a list of business units configured by the example administrator(s) 112 and/or the example developer(s) 114. In some examples, the selection of a business unit is based on a request sent by the example IM 142 (FIG. 1) (via the IM communicator 206 of FIG. 2).

At block 504, the example usage manager 200 selects a service. In some examples, the usage manager 200 selects the example service 107a based on a request made by an administrator 112 (FIG. 1) and/or a developer 114 (FIG. 1). Alternatively or additionally, in some examples, the usage manager 200 selects the service 107a based on a list of services generated by the VIN 106 when the VIN 106 performs a service discovery cycle (e.g., the VIN 106 uses the probes and/or the monitoring agents installed on the compute nodes 104a-104d to discover the services 107a-107d installed on the compute nodes 104a-104d).

At block 506, the example usage manager 200 retrieves the example business unit-assigned usage records 136 that include the BUID 130 corresponding to the business unit selected at block 502 and a SID 124 of the example service 107a selected at block 504. At block 508, the example record aggregator 202 determines whether the business unit-assigned usage records 136 retrieved at block 506 are to be aggregated according to an account-based allocation. In some examples, the record aggregator 202 maintains a list identifying which of the SIDs 124 are associated with services to be aggregated according to an account-based allocation. If the business unit-assigned usage records 136 are to be aggregated according to an account-based allocation, program control advances to block 510. Otherwise, if the business unit-assigned usage records 136 are not to be aggregated according to an account-based allocation, program control advances to block 516.

At block 510, the example record aggregator 202 counts a number of unique UIDs 122 in the business unit-assigned usage records 136 retrieved at block 506 that fall within a timeframe of interest. At block 512, the example record aggregator 202 generates the example aggregate usage record 204a by associating the BUID 130, the SID 124, the timeframe of interest, and the number of unique UIDs 122 calculated at block 510. At block 514, the example IM communicator 206 stores the aggregate usage record 204a in the aggregate database 133. Program control advances to block 524.

At block 516, the example record aggregator 202 determines whether the business unit-assigned usage records 136 retrieved at block 506 are to be aggregated according to a usage-based allocation. In some examples, the record aggregator 202 maintains a list identifying which SIDs 124 are associated with services to be aggregated according to a usage-based allocation. If the business unit-assigned usage records 136 are to be aggregated according to a usage-based allocation, program control advances to block 518. Otherwise, if the business unit-assigned usage records 136 are not to be aggregated according to a usage-based allocation, program control advances to block 524.

At block 518, the example record aggregator 202 counts a number of occurrences of use of the service during the timeframe of interest based on the business unit-assigned usage records 136. For example, a first one of the business unit-assigned usage records 136 may indicate (e.g., via the usage field 126) that a user (e.g., identified by the UID 122) used the service 107a ten times during a first portion of the timeframe of interest and a second one of the business unit-assigned usage records 136 may indicate that the user used the service fifteen times during a second portion of the timeframe of interest, etc. At block 520, the example record aggregator 202 generates an aggregate usage record 204c by associating the BUID 130, the SID 124, the timeframe of interest, and number of occurrences of use of the service calculated at block 518. At block 522, the example IM communicator 206 stores the aggregate usage record 204c in the aggregate database 133. Program control advances to block 524.

At block 524, the example usage manager 200 determines whether there is another service for which to calculate an aggregate usage record 204a-204c. If there is another service for which to calculate an aggregate usage record 204a-204c, program control returns to block 504. Otherwise, if there is not another service for which to calculate an aggregate usage record 204a-204c, program control advances to block 526. At block 526, the example usage manager 200 determines whether there is another business unit for which to calculate aggregate usage records 204a-204c. If there is another business unit for which to calculate aggregate usage records 204a-204c, program control returns to block 502. Otherwise, if there is not another business unit for which to calculate aggregate usage records 204a-204c, the example program 500 ends.

Figure 6:
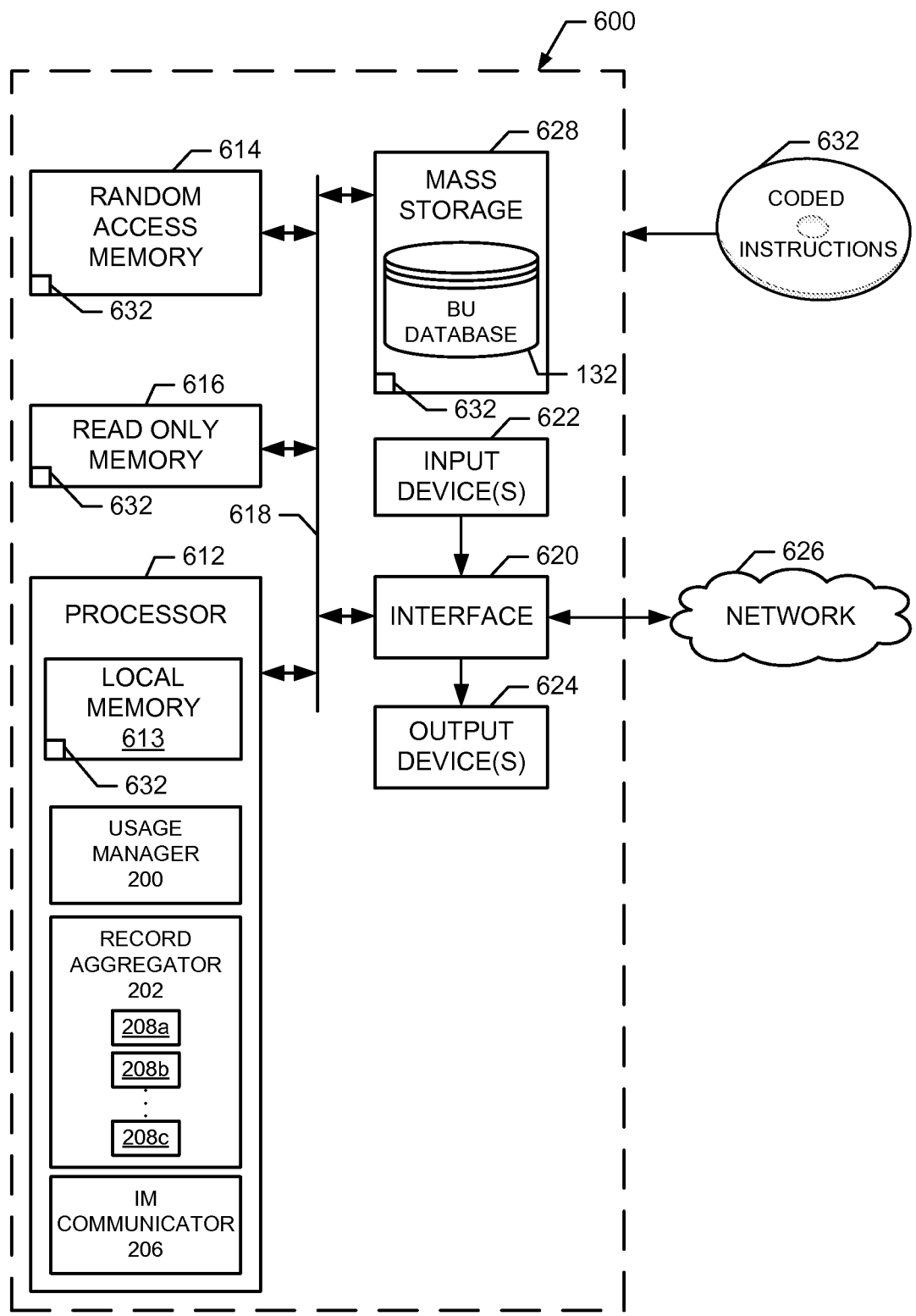
FIG. 6 is a block diagram of an example processor platform structured to execute the example instructions of FIGS. 3, 4, and/or 5 to implement the example probe manager of FIG. 1 and/or the example usage adaptor of FIGS. 1 and 2.

FIG. 6 is a block diagram of an example processor platform 600 capable of executing the instructions of FIGS. 3, 4, and/or 5 to implement the probe manager 108 of FIG. 1 and/or the usage adaptor 128 of FIGS. 1 and 2. The processor platform 600 can be, for example, a server, a personal computer, a workstation, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. In the illustrated example, the processor 612 is structured to include the example usage manager 200, the example record aggregator 202, and the example IM communicator 206.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 of FIGS. 3, 4, and/or 5 may be stored in the mass storage device 628, in the volatile memory 614, in the non-volatile memory 616, and/or on a removable tangible computer readable storage medium such as a CD or DVD.

From the foregoing, it will appreciated that the above disclosed methods, apparatus and articles of manufacture facilitate monitoring the usage of compute nodes, such as virtual machines and containers, installed in a computing environment. As disclosed herein, an example usage adaptor may manage usage data retrieved from the compute nodes so that an infrastructure manager may assign operating costs to business units using actual usage data instead of modeling and estimating business unit usage. As a result, the example usage adaptor provides more accurate costs of operating the computing environments for the business units.

Additionally, instead of changing a cost model when the services within the computing environment change, in some examples disclosed herein, costs are calculated for services executing on compute nodes in the computing environment that are discovered by the VIN. Thus, the example methods, apparatus and articles of manufacture may further reduce consumption of computing resources (e.g., processing cycles, memory usage, etc.) by reducing and/or eliminating the processing time required to generate, modify, and/or execute the model to determine costs for the business units. In some examples disclosed herein the aggregate usage records generated by the usage adaptor eliminate the need for the IM to use a model to predict the costs to the business units of using the services. Thus, the usage adaptor as disclosed herein reduces the memory and/or resource usage of the system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to monitor usage of a plurality of compute n odes in a virtual computing environment, the method comprising:
  identifying a service in the virtual computing environment based on user input at an interface in communication with a probe manager;
  automatically installing a probe, by the probe manager, on a compute node associated with the service, the probe in communication with the probe manager and having administrator privileges;
  obtaining audit data at the probe manager from the probe;
  filtering the audit data, by the probe manager, based on a usage definition stored in a definitional database, to produce usage records;
  obtaining the usage records from the probe manager, the usage records comprising a user identifier associated with a user and information indicating at least one occurrence of the user consuming the service in the virtual computing environment by configuring a server on a virtual machine of the virtual computing environment, wherein the probe manager retrieves at least a portion of the usage records from the probe;
  determining a membership of the user within a business unit of an entity, wherein determining the membership is performed by associating the user identifier with a corresponding business unit identifier;
  creating, via a processor, aggregate usage records for the business unit by assigning the usage records to the business unit based on the membership of the user; and
  transmitting the aggregate usage records to an infrastructure manager, the infrastructure manager to calculate total monetary costs of the service for the business unit based on the aggregate usage records.

2. The method of claim 1, wherein the creating of the aggregate usage records for the business unit includes associating the business unit identifier, a service identifier corresponding to the service, and a total number of occurrences of the users consuming the service, to the business unit.

3. The method of claim 1, wherein the creating of the aggregate usage records for the business unit includes, associating the business unit identifier, a service identifier corresponding to the service, and a total number of users that consumed the service, to the business unit.

4. The method of claim 1, wherein the creating of the aggregate usage records for the business unit includes associating the business unit identifier, a service identifier corresponding to the service, and a total amount of a resource consumed by users corresponding to the respective one of the business units, to the business u nit.

5. The method of claim 1, wherein the usage records are generated by invoking scripts on the compute node within the virtual computing environment to capture usage data associated with the service executing on the compute node, the usage data including user identifiers and service identifiers associated with occurrences of corresponding users consuming the service.

6. The method of claim 5, wherein the aggregate usage records are generated based on time stamps associated with the usage data.

7. The method of claim 1, wherein the aggregate usage records replace a usage model that estimates a total number of users that consumed the service.

8. An apparatus having a hardware-based processor and a memory storage, the apparatus configured to monitor usage of a virtual computing environment, the apparatus comprising:
  a probe manager executing on the processor and configured to:
    identify a service in the virtual computing environment based on user input at an interface in communication with the probe manager;
    automatically install a probe on a compute node associated with the service, the probe in communication with the probe manager and having administrator privileges;
    obtain audit data from the probe;
    filter the audit data based on a usage definition stored in a definitional database, to produce usage records;
  a usage manager executing on the processor and configured to:
    obtain the usage records from the probe manager, the usage records comprising a user identifier associated with a user and information indicating at least one occurrence of the user consuming the service in the virtual computing environment by configuring a server on a virtual machine of the virtual computing environment, wherein the probe manager retrieves at least a portion of the usage records from the probe; and
    determine a membership of the user within a business unit of an entity, wherein determining the membership is performed by associating the user identifier with a corresponding business unit identifier;
  a record aggregator to create aggregate usage records for the business unit by assigning the usage records to the business unit based on the membership of the user;
  and an infrastructure manager communicator executing on the processor and configured to transmit the aggregate usage records to an infrastructure manager, the infrastructure manager to calculate total monetary costs of the service for the business unit based on the aggregate usage records.

9. The apparatus of claim 8, wherein to create the aggregate usage records for the business unit, the record aggregator is to, for the business unit, associate the business unit identifier, a service identifier corresponding to the service, and a total number of occurrences of the users consuming the service, to the business unit.

10. The apparatus of claim 8, wherein to create the aggregate usage records for the business unit, the record aggregator is to, for the business unit, associate the business unit identifier, a service identifier corresponding to the service, and a total number of users that consumed the service, to the business unit.

11. The apparatus of claim 8, wherein to create the aggregate usage records for the business unit, the record aggregator is to, for the business unit, associate the business unit identifier, a service identifier corresponding to the service, and a total amount of a resource consumed by users corresponding to the business unit, to the business unit.

12. The apparatus of claim 8, wherein the usage records are generated by invoking scripts on the compute node within the virtual computing environment to capture usage data associated with the service executing on the compute node, the usage data including user identifiers and service identifiers associated with occurrences of corresponding users consuming the service.

13. The apparatus of claim 12, wherein the aggregate usage records are generated based on time stamps associated with the usage data.

14. The apparatus of claim 8, wherein the aggregate usage records reduce processor use by the infrastructure manager by replacing a usage model that estimates a total number of users that consumed the service.

15. A non-transitory, computer readable storage medium comprising instructions that, when executed, cause a machine to at least: identify a service in the virtual computing environment based on user input at an interface in communication with a probe manager: automatically install a probe, by the probe manager, on a compute node associated with the service, the probe in communication with the probe manager and having administrator privileges;

obtain audit data at the probe manager from the probe;

filter the audit data, by the probe manager, based on a usage definition stored in a definitional database, to produce usage records;

obtain the usage records from the probe manager, the usage records comprising a user identifier associated with a user and information indicating at least one occurrence of the user-consuming the service in the virtual computing environment by configuring a server on a virtual machine of the virtual computing environment, wherein the probe manager retrieves at least a portion of the usage records from the probe;

determine a membership of the user within a business unit of an entity, wherein determining the membership is performed by associating the user identifier with a corresponding business unit identifier;

create aggregate usage records for the business unit by assigning the usage records to the business unit based on the membership of the user; and transmit the aggregate usage records to an infrastructure manager, the infrastructure manager to calculate total monetary costs of the service for the business unit based on the aggregate usage records.

16. The non-transitory, computer readable storage medium of claim 15, wherein the instructions, when executed, cause the machine to associate a business unit identifier, a service identifier corresponding to the service, and a total number of occurrences of the users consuming the service, to the business unit.

17. The non-transitory, computer readable storage medium of claim 15, wherein the instructions, when executed, cause the machine to associate a business unit identifier, a service identifier corresponding to the service, and a total number of users that consumed the service, to the business unit.

18. The non-transitory, computer readable storage medium of claim 15, wherein the instructions, when executed, further cause the machine to associate a business unit identifier, a service identifier corresponding to the service, and a total amount of a resource consumed by users corresponding to the business unit to the business unit.

19. The non-transitory, computer readable storage medium of claim 15, wherein the usage records are generated by invoking scripts on the compute node within the virtual computing environment to capture usage data associated with the service executing on the compute node, the usage data including user identifiers and service identifiers associated with occurrences of corresponding users consuming the service.

20. The non-transitory, computer readable storage medium of claim 19, wherein the aggregate usage records are generated based on time stamps associated with the usage data.

21. The non-transitory, computer readable storage medium of claim 15, wherein the aggregate usage records reduce processor use by the infrastructure manager by replacing a usage model that estimates a total number of users that consumed the service.

* * * * *